(12) United States Patent
Sastre Martinez et al.

(10) Patent No.: US 12,254,276 B2
(45) Date of Patent: Mar. 18, 2025

(54) DESCRIPTIVE TOPIC MODELING WITH LDA ON BAGS OF UTTERANCE CLUSTERS

(71) Applicant: ACCENTURE GLOBAL SOLUTIONS LIMITED, Dublin (IE)

(72) Inventors: Javier Miguel Sastre Martinez, County Dublin (IE); Sean Gorman, Goatstown (IE); Aisling Nugent, Dublin (IE); Anandita Pal, Dublin (IE)

(73) Assignee: Accenture Global Solutions Limited, Dublin (IE)

( * ) Notice: Subject to any disclaimer, the term of this patent is extended or adjusted under 35 U.S.C. 154(b) by 437 days.

(21) Appl. No.: 17/682,368

(22) Filed: Feb. 28, 2022

(65) Prior Publication Data
US 2023/0274092 A1    Aug. 31, 2023

(51) Int. Cl.
*G06F 40/35* (2020.01)
*G06F 18/23213* (2023.01)
*G06F 40/58* (2020.01)

(52) U.S. Cl.
CPC ........ *G06F 40/35* (2020.01); *G06F 18/23213* (2023.01); *G06F 40/58* (2020.01)

(58) Field of Classification Search
CPC ............. G06F 16/2428; G06F 16/2455; G06F 16/248; G06F 40/35; G06F 18/23213; G06F 40/58; G06F 40/216; G06F 40/289; G06F 40/30; G06N 20/00
See application file for complete search history.

(56) References Cited

U.S. PATENT DOCUMENTS

| | | | | |
|---|---|---|---|---|
| 11,024,299 B1* | 6/2021 | Drake | ................... | G10L 15/197 |
| | | | | 707/737 |
| 2018/0357318 A1* | 12/2018 | Chen | ................... | G06F 16/9535 |
| | | | | 707/737 |
| 2019/0147853 A1* | 5/2019 | Gunasekara | .......... | G06F 40/216 |
| | | | | 704/243 |
| 2020/0065334 A1* | 2/2020 | Rodriguez | .............. | G06F 40/35 |
| | | | | 707/737 |
| 2021/0073616 A1* | 3/2021 | Moraitis | ................ | G06N 3/063 |
| | | | | 707/737 |

(Continued)

OTHER PUBLICATIONS

Khalid et al. "Topic Detection from Conversational Dialogue Corpus with Parallel Dirchlet Allocation Model and Elbow Method" (Year: 2020).*

*Primary Examiner* — Yuk Ting Choi
(74) *Attorney, Agent, or Firm* — Polsinelli PC (57) ABSTRACT

The present disclosure relates to a system, a method, and a product for intent discovery. The system includes a processor in communication with a memory storing instructions. When the processor executes the instructions, the instructions are configured to cause the processor to: obtain documents comprising a set of utterances, extract the set of utterances from the documents, generate a set of utterance embeddings based on the set of utterances, clusterize the set of utterance embeddings to obtain a plurality of clusters, obtain a cluster label for each cluster, encode each document based on a number of times each utterance cluster identifier (ID) appears to obtain an encoded document, perform latent Dirichlet allocation (LDA) on the encoded documents to obtain K topics, and each topic corresponding to a list of key clusters with cluster IDs, and for each topic, replace the cluster IDs with the cluster labels.

18 Claims, 5 Drawing Sheets

(56) References Cited

U.S. PATENT DOCUMENTS

2021/0390127 A1* 12/2021 Fox ................... G06F 16/335
　　　　　　　　　　　　　　　　　707/737
2022/0221374 A1*  7/2022 Gan ................... G01M 13/028
　　　　　　　　　　　　　　　　　704/243

* cited by examiner

```
obtaining documents comprising a set of utterances;     410
                            ↓
extracting the set of utterances from the documents;    420
                            ↓
generating a set of utterance embeddings based on the set of utterances;   430
                            ↓
clusterizing the set of utterance embeddings to obtain a plurality of clusters, each
cluster comprising one or more utterance embeddings;    440
                            ↓
obtaining a cluster label for each cluster;    450
                            ↓
for each cluster, encoding each document based on a number of times each
utterance cluster identifier (ID) appears to obtain an encoded document, the encoded
document comprising at least one cluster ID with a weight;    460
                            ↓
performing latent Dirichlet allocation (LDA) on the encoded documents to obtain K
topics, K being a positive integer, and each topic corresponding to a list of key
clusters with cluster IDs    470
                            ↓
for each topic, replacing the cluster IDs with the cluster labels    480
```

DESCRIPTIVE TOPIC MODELING WITH LDA ON BAGS OF UTTERANCE CLUSTERS

TECHNICAL FIELD

This disclosure relates to artificial intelligence (AI), and is particularly directed to an AI based intent determination according to documents.

BACKGROUND

A major part of business operations is interacting with customers. Traditionally this was done by human agents, face to face or over telephone calls within customer support centers. Recently, human and AI collaboration has evolved at a very noticeable pace, and thus, there is now a move to automating this through the use of chat bots and virtual assistants, as well as to analyze recorded conversations to gather insights.

Determining what are the different services the human agent provides and estimating the incurred call handling costs per service is key to prioritizing service automation. Customers are frequently frustrated when chat bots and virtual agents cannot accurately understand the customer's requests. The existing systems to determine a customer's intent according to a call/conversation may perform at a low accuracy and/or undesired maturity level. Technical improvements are desirable to improve customer satisfaction and improve resource efficiency.

SUMMARY

The present disclosure describes a system, a method, and/or a product for taking a sample dataset of human dialogues and semi-automatically determining intents of the different types of calls. The system, method, and/or product may discover intents, which are more meaningful descriptions of each call type than simple sets of keywords, addressing one or more of the issues/problems discussed above. Various embodiments in the present disclosure may discover intent candidates described by key utterances instead of keywords, hence to facilitate the task of understanding the intent each topic corresponds to and manually creating a proper intent label. In various embodiments, key utterances may provide more information than keywords, and thus, reduce the need to manually review individual dialogs to figure out the intents, e.g., manually looking for utterances that correspond to the customer ask or that are closely related to the customer ask, since the algorithm automatically extracts them as the key utterances. Various embodiments in the present disclosure may result in high accuracy and improved maturity level for determining intent based on a call/conversation.

The present disclosure describes a system for intent discovery. The system includes a memory storing instructions; and a processor in communication with the memory. When the processor executes the instructions, the instructions are configured to cause the processor to: obtain documents comprising a set of utterances, extract the set of utterances from the documents, generate a set of utterance embeddings based on the set of utterances, clusterize the set of utterance embeddings to obtain a plurality of clusters, each cluster comprising one or more utterance embeddings, obtain a cluster label for each cluster, for each cluster, encode each document based on a number of times each utterance cluster identifier (ID) appears to obtain an encoded document, the encoded document comprising at least one cluster ID with a weight, perform latent Dirichlet allocation (LDA) on the encoded documents to obtain K topics, K being a positive integer, and each topic corresponding to a list of key clusters with cluster IDs, and for each topic, replace the cluster IDs with the cluster labels.

The present disclosure also describes a method for intent discovery. The method includes obtaining, by a device, documents comprising a set of utterances. The device includes a memory storing instructions and a processor in communication with the memory. The method also includes extracting, by the device, the set of utterances from the documents, generating, by the device, a set of utterance embeddings based on the set of utterances, clusterizing, by the device, the set of utterance embeddings to obtain a plurality of clusters, each cluster comprising one or more utterance embeddings, obtaining, by the device, a cluster label for each cluster, for each cluster, encoding, by the device, each document based on a number of times each utterance cluster identifier (ID) appears to obtain an encoded document, the encoded document comprising at least one cluster ID with a weight, performing, by the device, latent Dirichlet allocation (LDA) on the encoded documents to obtain K topics, K being a positive integer, and each topic corresponding to a list of key clusters with cluster IDs, and for each topic, replacing, by the device, the cluster IDs with the cluster labels.

The present disclosure further describes a product for intent discovery. The product includes machine-readable media other than a transitory signal; and instructions stored on the machine-readable media, wherein when a processor executes the instructions, the processor is configured to: obtain documents comprising a set of utterances, extract the set of utterances from the documents, generate a set of utterance embeddings based on the set of utterances, clusterize the set of utterance embeddings to obtain a plurality of clusters, each cluster comprising one or more utterance embeddings, obtain a cluster label for each cluster, for each cluster, encode each document based on a number of times each utterance cluster identifier (ID) appears to obtain an encoded document, the encoded document comprising at least one cluster ID with a weight, perform latent Dirichlet allocation (LDA) on the encoded documents to obtain K topics, K being a positive integer, and each topic corresponding to a list of key clusters with cluster IDs, and for each topic, replace the cluster IDs with the cluster labels.

In another aspect, an embodiment of the present disclosure provides non-transitory computer-readable mediums storing instructions which when executed by a computer cause the computer to perform the above methods.

The above and other aspects and their implementations are described in greater detail in the drawings, the descriptions, and the claims.

DETAILED DESCRIPTION

The disclosure will now be described in detail hereinafter with reference to the accompanied drawings, which form a part of the present disclosure, and which show, by way of illustration, specific examples of embodiments. Please note that the disclosure may, however, be embodied in a variety of different forms and, therefore, the covered or claimed subject matter is intended to be construed as not being limited to any of the embodiments to be set forth below. Please also note that the disclosure may be embodied as methods, devices, components, or systems. Accordingly, embodiments of the disclosure may, for example, take the form of hardware, software, firmware or any combination thereof.

Throughout the specification and claims, terms may have nuanced meanings suggested or implied in context beyond an explicitly stated meaning. Likewise, the phrase "in one embodiment" or "in one implementation" as used herein does not necessarily refer to the same embodiment or implementation and the phrase "in another embodiment" or "in another implementation" as used herein does not necessarily refer to a different embodiment or implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

A major part of business operations is interacting with customers. Traditionally this was done by human agents, face to face or over telephone calls within customer support centers. Recently, human and AI collaboration has evolved at a very noticeable pace, and thus, there is now a move to automating this through the use of chat bots and virtual assistants, as well as to analyze recorded conversations with human or virtual agents to gather insights.

Determining what are the different services the human agent provides and estimating the incurred call handling costs per service is key to prioritizing service automation. The existing systems to determine a customer's intent according to a call/conversation may have a low accuracy and undesired maturity level.

The present disclosure describes a system, a method, and a product for intent discovery by combining embeddings and latent Dirichlet allocation (LDA), which takes a sample dataset of human dialogues and semi-automatically determines intents of the different types of calls, and provides more meaningful descriptions of each call type than simple sets of keywords. The present disclosure may address one or more of the issues/problems discussed above, resulting in high accuracy and improved maturity level for determining intents based on a call/conversation. LDA is a method based on a generative statistical model which is used in natural language processing, for example, topic modeling.

In various embodiments in the present disclosure, the terms of "conversation", "call", "dialogue", and/or "document" may refer to same meanings, and may be interchangeably used. Various embodiments in the present disclosure analyze a set of human dialogues to determine a list of dialogue topics, and each topic is described by a list of key utterances (e.g., semantic text segments) extracted from the dialogues themselves. The determined list of dialogue topics may be regarded as the intent of the dialogues. More detailed description is included in U.S. application Ser. No. 16/742,508, filed on Jan. 14, 2020 and published as U.S. Patent Application Publication No. 2021/0142791 with publication date May 13, 2021, which is incorporated herein by reference in its entirety.

The below exemplary document may include dialogue topics for train, hotel and restaurant booking, respectively, but more topics and key utterances per topic may be generated. An exemplary document may include the following utterances: "I need a train on Thursday"; "I need to find a train leaving on Thursday going to Cambridge"; and "Train TR8466 leaves at 14:40 and arrives by 17:30". Another exemplary document may include the following utterances: "I'm looking for a hotel instead of a guesthouse"; "I would like a guesthouse that is 4 stars"; and "I need free parking and free wi-fi though". Another exemplary document may include the following utterances: "I'm looking for a moderately priced restaurant that serves Chinese food"; "Is there a particular kind of restaurant you would like?" and "Can I get the phone number, postcode, and address please?"

The present disclosure describes various embodiment including the use of an utterance encoder that has been trained to compute semantic similarity between pairs of utterances, such as the universal sentence encoder (USE) or those generated by means of Siamese bidirectional encoder representations from transformers (BERT) networks. Various embodiments in the present disclosure may support different languages as long as an utterance encoder for the target language is used.

The present disclosure describes various embodiments for combining modern utterance embeddings with classic latent Dirichlet allocation (LDA) for topic modeling in order to generate topics described by key utterances instead of keywords. In various embodiments, topic modeling is used to determine what are the reasons behind customer center calls: what is the customer's intent or what does the customer ask (i.e., key topics). In some implementations, a classic approach may provide keywords as explanation, such as "train"; and/or may still need to manually check at least a few conversations to look for the actual ask/intent from the customer (searching for the utterance that contains the actual ask). In some other implementations, the topic modeling may provide key utterances such as "I need a train on Thursday", lowering the need of checking a few more conversations to some extent. Thus, the present disclosure provides a novel and efficient way to perform intent discovery with better intent descriptions, and may remove the need to manually review intent dialogues to verify what the intent is about.

Figure 1:
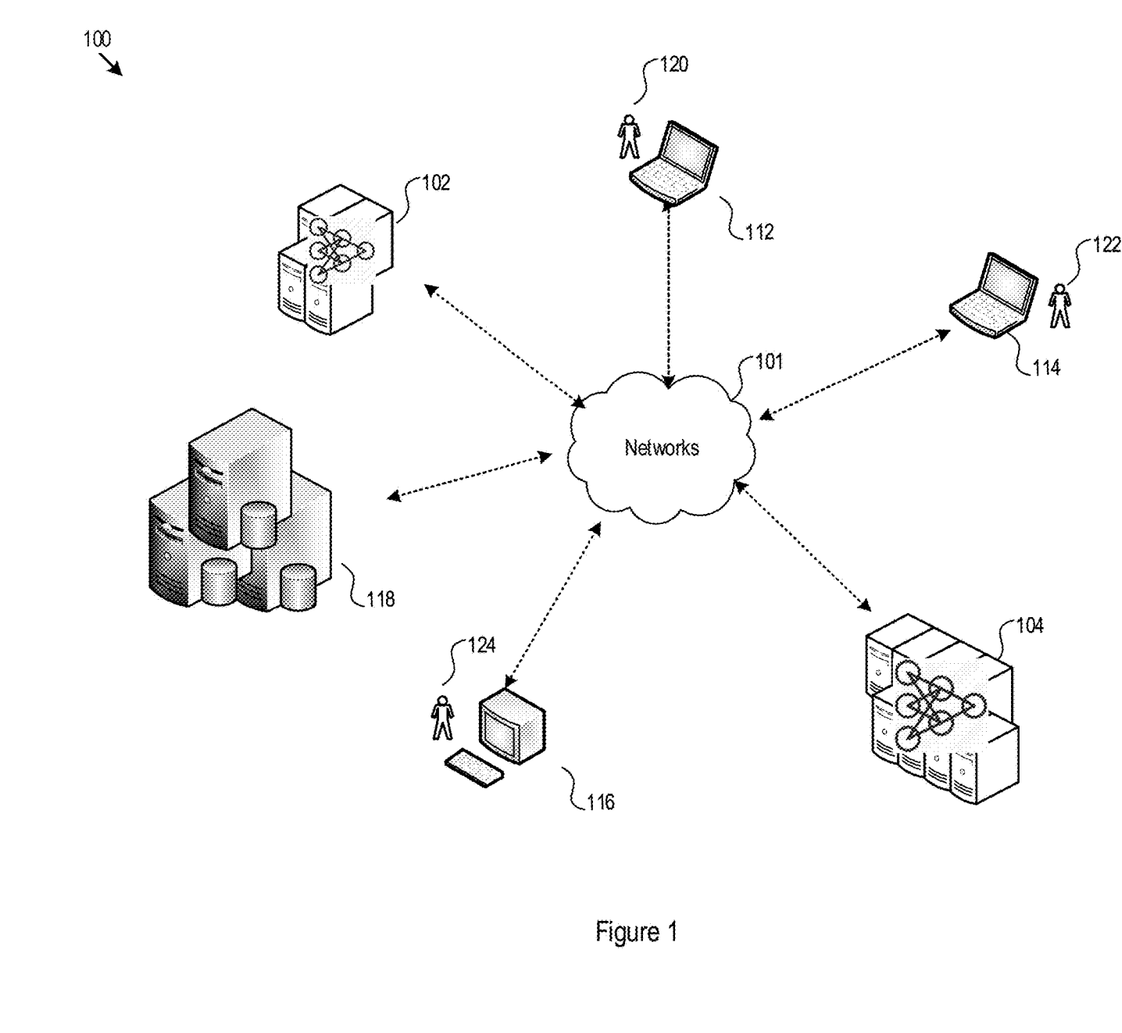
FIG. 1 shows an exemplary electronic communication environment for implementing intent discovery.

FIG. 1 shows an exemplary electronic communication environment 100 in which an intent discovery by combining embeddings and LDA may be implemented. The electronic communication environment 100 may include a portion or all of the following: one or more servers 102 and 104, one or more user devices 112, 114, and 116 associated with users 120, 122, and 124, and one or more databases 118, in communication with each other via public or private communication networks 101.

The user devices 112, 114, and 116 may be any form of mobile or fixed electronic devices including but not limited to desktop personal computer, laptop computers, tablets, mobile phones, personal digital assistants, and the like.

The one or more database 118 of FIG. 1 may be hosted in a central database server, a plurality of distributed database servers, or in cloud-based database hosts. The database 118 may be organized and implemented in any form, including but not limited to document database containing conversations and/or dialogues, embedding space database containing embeddings (or embedding vectors) and relationships, and the like. The database 118 may be configured to store the intermediate data and/or final results for implementing the intent discovery by combining embeddings and LDA.

Figure 2:
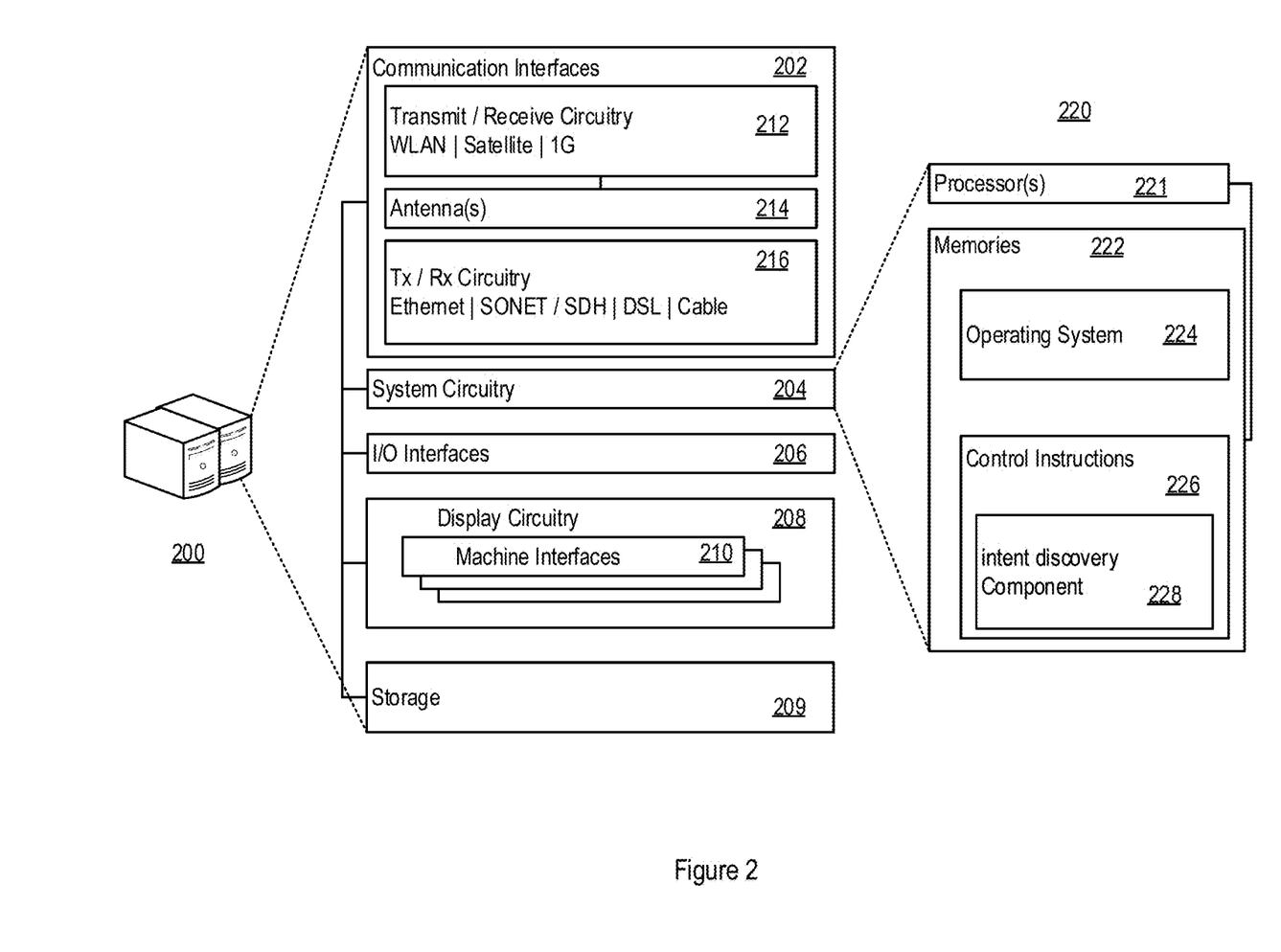
FIG. 2 shows computer systems that may be used to implement various components of the electronic communication environment of FIG. 1.

FIG. 2 shows an exemplary computer system 200 for implementing the one or more servers 102 and 104, or the user devices 112, 114, and 116. The computer system 200 may include communication interfaces 202, system circuitry 204, input/output (I/O) interfaces 206, storage 209, and display circuitry 208 that generates machine interfaces 210 locally or for remote display, e.g., in a web browser running on a local or remote machine. The machine interfaces 210 and the I/O interfaces 206 may include GUIs, touch sensitive displays, voice or facial recognition inputs, buttons, switches, speakers and other user interface elements. Additional examples of the I/O interfaces 206 include microphones, video and still image cameras, headset and microphone input/output jacks, Universal Serial Bus (USB) connectors, memory card slots, and other types of inputs. The I/O interfaces 206 may further include magnetic or optical media interfaces (e.g., a CDROM or DVD drive), serial and parallel bus interfaces, and keyboard and mouse interfaces.

The communication interfaces 202 may include wireless transmitters and receivers ("transceivers") 212 and any antennas 214 used by the transmitting and receiving circuitry of the transceivers 212. The transceivers 212 and antennas 214 may support Wi-Fi network communications, for instance, under any version of IEEE 802.11, e.g., 802.11n or 802.11ac. The communication interfaces 202 may also include wireline transceivers 216. The wireline transceivers 116 may provide physical layer interfaces for any of a wide range of communication protocols, such as any type of Ethernet, data over cable service interface specification (DOCSIS), digital subscriber line (DSL), Synchronous Optical Network (SONET), or other protocol.

The storage 209 may be used to store various initial, intermediate, or final data or model for implementing the intent discovery by combining embeddings and LDA. These data corpus may alternatively be stored in the database 118 of FIG. 1. In one implementation, the storage 209 of the computer system 200 may be integral with the database 118 of FIG. 1. The storage 209 may be centralized or distributed, and may be local or remote to the computer system 200. For example, the storage 209 may be hosted remotely by a cloud computing service provider.

The system circuitry 204 may include hardware, software, firmware, or other circuitry in any combination. The system circuitry 204 may be implemented, for example, with one or more systems on a chip (SoC), application specific integrated circuits (ASIC), microprocessors, discrete analog and digital circuits, and other circuitry.

For example, the system circuitry 204 may be implemented as 220 for the intent discovery by combining embeddings and LDA. The system circuitry 220 may include one or more processors 221 and memories 222. The memories 222 stores, for example, control instructions 226 and an operating system 224. The control instructions 226, for example may include instructions for implementing the components 228 of intent discovery. In one implementation, the instruction processors 221 execute the control instructions 226 and the operating system 224 to carry out any desired functionality related to the intent discovery by combining embeddings and LDA.

Figure 3:
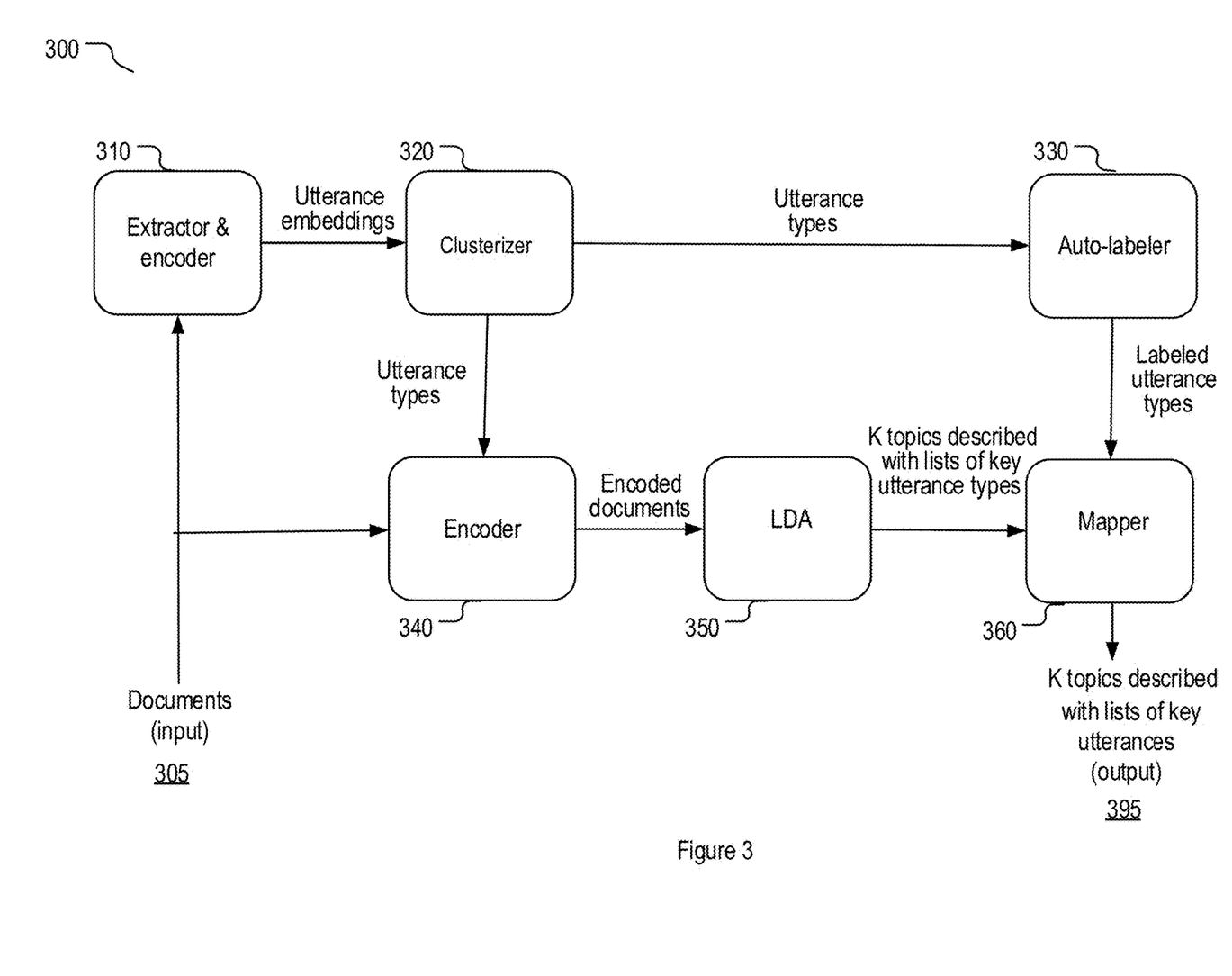
FIG. 3 shows a schematic diagram of a system for intent discovery based on utterance embeddings.

The present disclosure describes a system for intent discovery by combining embeddings and LDA, which may include a portion or all components as shown in FIG. 3. The system 300 may discover intents by performing LDA on utterance clusters. The system 300 may include a portion or all of the following: an extractor and encoder 310, a clusterizer 320, an auto-labeler 330, an encoder 340, an LDA module 350, and/or a mapper 360. The system may receive an input 305, which may include one or more documents including a set of utterances. The system may generate an output 395, which may include one or more topics described with lists of key utterances.

Figure 4:
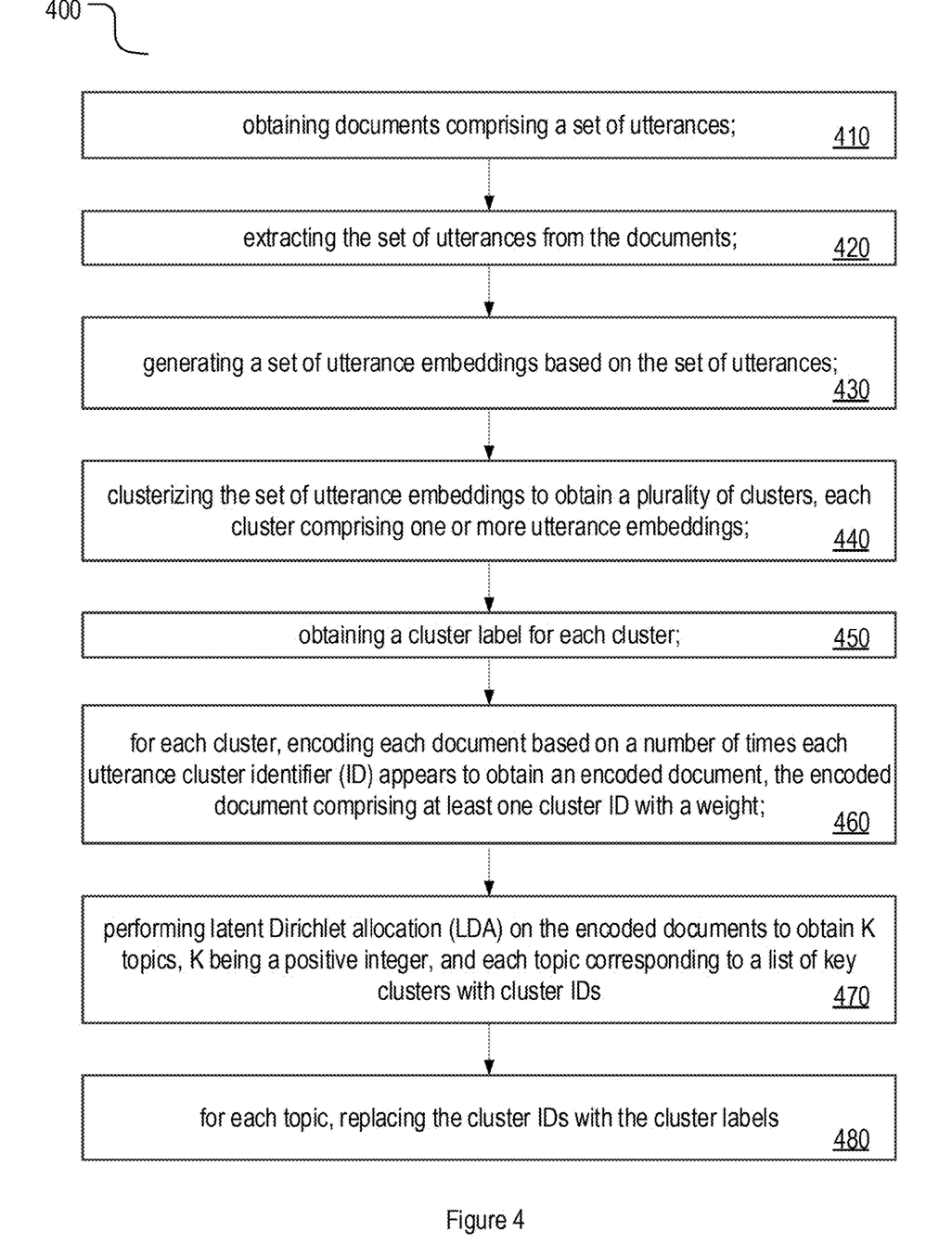
FIG. 4 shows a flow diagram of a method for intent discovery.

Referring to FIG. 4, the present disclosure also describes a method 400 for performing intent discovery by combining embeddings and LDA. The method 400 may include a portion or all of the following steps: step 410, obtaining documents comprising a set of utterances; step 420, extracting the set of utterances from the documents; step 430, generating a set of utterance embeddings based on the set of utterances; step 440, clusterizing the set of utterance embeddings to obtain a plurality of clusters, each cluster comprising one or more utterance embeddings; step 450, obtaining a cluster label for each cluster; step 460, for each cluster, encoding each document based on a number of times each utterance cluster identifier (ID) appears to obtain an encoded document, the encoded document comprising at least one cluster ID with a weight; step 470, performing latent Dirichlet allocation (LDA) on the encoded documents to obtain K topics, K being a positive integer, and each topic corresponding to a list of key clusters with cluster IDs, and/or step 480, for each topic, replacing the cluster IDs with the cluster labels. In some implementations, step 420 and step 430 may be a single step of generating a set of utterance embeddings from the documents.

The system 300 in FIG. 3 and the method 400 in FIG. 4 perform intent discovery by combining utterance embeddings and LDA. A similar system and/or method may perform intent discovery by combining word embeddings and LDA, which is described later. In both systems/methods, documents may be converted into bags of items. In the system/method for perform intent discovery by combining utterance embeddings and LDA, items may be types of utterances (each utterance cluster corresponds to a type); and/or in the system/method for perform intent discovery by combining word embeddings and LDA, items may be types of words/standard concepts. For example, each word cluster corresponds to a group of similar words/synonyms/standard concepts referred to by any synonym in the cluster.

The extractor and encoder 310 in FIG. 3 may perform a portion or all of the steps 410-430. Specifically, the extractor and encoder may obtain a document comprising a set of utterances, and/or extract the set of utterances from the document, and/or generate a set of utterance embeddings based on the set of utterances. The extractor and encoder 310 may receive one or more documents as input, and generate utterance embeddings as output to the clusterizer 320. In some implementations, the extractor and encoder 310 may be a single module/unit to receive a document and generate a set of utterance embeddings based on the document without separately extracting a set of utterances.

In some implementations, each utterance may represent a turn in the conversation by an agent or a customer but not necessarily swapping each time so the agent may have multiple utterances before the customer speaks again, and vice-versa. When the document/dialogue/conversation is in block text form, a simple approach may be utilized to split the block text form into sentences and consider each sentence to be an utterance. In some other implementations, utterance extraction may depend on the dataset so it may be likely/necessary to use some custom extraction methods.

For example, dialogs may have already been fragmented into segments of text spoken either by a human agent or a customer.

CUSTOMER: I need a train on Thursday.
AGENT: Where would you like to go?
CUSTOMER: I will be going from Canbrige arriving in Kingls Lynn.
AGENT: Do you have a specific time frame in mind?
CUSTOMER: The train should leave after 18:45 and should leave on Thursday.
AGENT: Train TR0481 is the closest to that, it leaves at 19:11. Should I get you some tickets?
CUSTOMER: Yes, I only need one ticket.
AGENT: I have a booking for 1, total fee of 9.8 GBP need paid at the station, O2IGKVWR is your reference number. Do you need anything else?
CUSTOMER: Thank you, that will be all.

In some other implementations, an utterance may be a piece of text spoken in a turn of conversation, either by an agent or a customer. Each utterance may be extracted from tagged documents and then be input into a neural network, which returns a vector representation of the utterance (e.g., the utterance embedding). In some other implementations, one or more of pretrained neural networks may be used, for example but not limited to, USE, MUSE, and/or SBERT.

In some implementations, the extractor and encoder may generate the set of utterance embeddings based on the set of utterances with a neural network sentence encoder. The sentence encoder may include one or a combination of the following sentence encoder models: a sentence bidirectional encoder representation from transformers (SBERT) sentence encoder, a universal sentence encoder (USE), and/or a multilingual universal sentence encoder (MUSE).

In various embodiments in the present disclosure, an utterance may be referred as the smallest unit of speech being a continuous piece of speech beginning and ending with a clear pause. In some implementations, the pause may be referred as a period of silence during conversation (or dialogue or speech). For example, an utterance may be "hello how can I help you?" and will be passed to the utterance encoder in that form. In some implementations, word contexts for this same utterance with a window size of 3 may be: "PAD PAD PAD hello how can I", "PAD PAD hello how can I help", PAD hello how can I help you", "how can I help you?", "how can I help you? PAD", "can I help you? PAD PAD", where PAD represents a padding token so that every word with context is equivalent in length (7 tokens long in this case—the center token plus 3 tokens either side). In some implementations, padding of utterances may be a technical detail of how the neural network ingests and encodes the utterances.

In some other implementations, the neural network for the sentence encoder may ingest a text segment of a plurality of words, that is, two or more words, three or more words, four or more words, that semantically may be determined by natural language processing circuitry to represent a single request (e.g., an utterance) and output a vector of fixed size (e.g., SBERT vectors have 768 dimensions, while Google's USE/MUSE may have 512 dimensions). The neural networks may support text in the same language they have been trained on. In some other implementations, the SBERT and USE may be trained and used in English; and/or the MUSE may be trained and used in a variety of 16 different languages. In some other implementations, the input to the sentence encoder may be an utterance in any of the supported languages and there is no need to specify what is the input language. In some other implementations, a single utterance may be in mixed languages.

The clusterizer 320 in FIG. 3 may receive the utterance embeddings from the extractor and encoder 310, and perform step 440. Specifically, the clusterizer 320 may clusterize the set of utterance embeddings to obtain a plurality of clusters, each cluster comprising one or more utterance embeddings corresponding to one or more utterances. The clusterizer 320 may output the plurality of clusters to the auto-labeler 330. In some implementations, each cluster may have an utterance type; and/or each cluster is a group of utterances that are semantically similar, for example, "where do you want to go?" and/or "what is your destination?".

In some implementations, the clusterizer may clusterize, based on a first hyperparameter and a second hyperparameter, the set of utterance embeddings to obtain the plurality of clusters, the first hyperparameter indicating a minimum number of utterance embeddings in any cluster, the second hyperparameter indicating a maximum distance between any neighboring pair of utterance embeddings in any cluster.

In some other implementations, the clusterizer may clusterize the set of utterance embeddings to obtain the plurality of clusters with a clustering algorithm of density-based spatial clustering of applications with noise (DBSCAN). DBSCAN is one of the data clustering algorithms, and is a popular and widely used clustering algorithm. In some other implementations, these may be the two hyperparameters of the DBSCAN algorithm; and/or other clusterization algorithms may have other hyperparameters. For example, a mixture of k-means and DBSCAN: the method may start creating a partition of the set of all utterances using k-means, then the method may include fragmenting each part separately by applying DBSCAN to the part. In some other implementations, it may be optional to select a particular clusterizer to use for the overall approach. Under some circumstances, some particular configuration may yield better results than some other configurations.

In general, some utterances may include very different words, but may be very close or equivalent in meaning, and their respective embeddings (or embedding vectors) may be close to each other in the embedding space. For example, a first utterance is "where do you want to go?"; and a second utterance is "what's your destination?" The first utterance and the second utterance include different words ("want to go" vs. "your destination"), nevertheless, their meanings are equivalent. Thus, in the embedding space, a first embedding vector corresponding to the first utterance and a second embedding vector corresponding to the second utterance may be very close to each other.

In some other implementations, an algorithm mainly based on DBSCAN may be used, which may be a classic clusterization algorithm that does not require to specify the number of clusters to generate but that decides to generate more or less clusters depending on a number of groups of close elements in the data.

In some other implementations, the algorithm may include one or more hyperparameters, for example two main hyperparameters: a minimum number of elements (or embedding vectors) required to form a cluster; and a maximum allowed distance between pairs of elements in a cluster, which may be referred to as the eps parameter. The maximum allowed distance may be a maximum distance between two neighbouring embedding vectors in a cluster. Hence, a DBSCAN cluster may not necessarily need to be a sphere but it can have a long shape: if A is close enough to B (i.e., the distance between embeddings A and B is smaller than and/or equal to the maximum allowed distance), and B is close enough to C (i.e., the distance between embeddings B and C is smaller than and/or equal to the maximum allowed distance), then A, B and C will form a cluster even if A is too far from C. In some other implementations, the algorithm may have a parameter indicating density of the elements (or embedding vectors) to form a cluster.

In some other implementations, the DBSCAN algorithm may flag certain elements as outliers not belonging to any cluster, which helps removing potential noise from the data. For example, in response to an utterance being too unique (e.g., being too far away from any other utterance based on the distance hyperparameter), removing it may make the approach more robust to noise. For example, it could potentially be just a transcription error.

In some other implementations, the clusterizer may choose a proper eps parameter. For the case of utterance embeddings, distances between vectors may range from 0 to 1. A too low value of the eps parameter (e.g., the eps parameter being close to 0, such as 0.1) may result in only identical copies of the same utterance forming clusters, and a too high value of the eps parameter (e.g., the eps parameter being close to 1, such as 0.9) may create very large clusters, for example, in an extreme case, a single cluster comprising all the utterances. Large heterogeneous clusters may include groups of not-necessarily equivalent utterances; and/or each cluster may correspond to a type of utterance, not to multiple types. When the eps is 1, a single cluster may be created comprising every utterance in the dataset, which may not allow distinguishing between different dialog intents.

In some other implementations, the eps value may be dependent on the dataset being used, and it is better not to use values of exactly 0 or 1 as they would be effectively useless. The eps value may be high enough such that utterances with the same intent and meaning are clustered together but not too high such that different intents and meanings are clustered together resulting in too few clusters. Too few clusters would also mean that LDA would have less to discriminate with in discovering the topics. Under some circumstances, a value of around 0.5 may produce the best results, which may be experimented with each dataset.

The clusterizer may choose an intermediate value that potentially helps finding utterance overlaps across different documents, so as long as utterances comprise similar concepts they should be clusterized into a common cluster even if they do not mention the exact same list of concepts. One example may be the example discussed above wherein the first utterance is "where do you want to go?"; and a second utterance is "what's your destination?".

In some other implementations, the clusterizer may further partition the set of utterance embeddings into a plurality of subsets of utterance embeddings, for each subset, clusterize the subset of utterance embeddings to obtain a subset of clusters, and/or combine all subsets of clusters to form the plurality of clusters.

Applying DBSCAN to a big amount of utterance vectors is computationally expensive since it requires the computation of the distance between every possible pair of vectors in the dataset. For example, 10,000 (i.e., 100×100) distances need to be computed for 100 utterances; and 1,000,000 (i.e., 1,000×1,000) distances need to be computed for 1,000 utterances. Apart from the time to clusterize, a memory (e.g., random access memory (RAM)) could also be depleted if DBSCAN is directly applied due to the large quantity of distances to store in memory. To avoid computing a large quantity of distances, so as to save computing resources (e.g., smaller memory size and/or lower processor power), k-means may be applied, wherein k-means may specify a number of partitions to generate and it is not necessary to compute all these distances. With k-means, the clusterizer may perform a first partition of all the utterance vectors into K parts (or K subsets of utterance vectors), and then further fragment each part (subset) into a number of clusters using DBSCAN. This way the number of distances to compute is several orders of magnitude smaller and the clusterization step ends in a matter of seconds or minutes instead of hours. For example, when there are 10,000 embedding vectors, a directly application of DBSCAN may need to calculate 100,000,000 (i.e., 10,000×10,000) distances; and an application of k-means with K=20 and then DBSCAN may need to calculate 5,000,000 (i.e., 500×500 times 20) distances. Hence, in this example, the quantity of distances that need to compute is 20 times smaller than with the application of k-means.

The auto-labeler 330 in FIG. 3 may receive the plurality of clusters and/or utterance types from the clusterizer 320, and perform step 450. Specifically, the auto-labeler may obtain a cluster label for each cluster. The auto-labeler 330 may output the cluster labels and/or the labeled utterance types to the mapper 360.

In some implementations, for each cluster, the auto-labeler may calculate a center in an embedding space for all utterance embeddings in the cluster, select a central utterance embedding in the cluster, the central utterance embedding being the closest utterance embedding to the center among all utterance embeddings in the cluster, and/or obtain the utterance corresponding to the central utterance embedding as the cluster label.

For one example, for each cluster, a vector that is the closest to the center of gravity of the cluster may be selected to construct the cluster label. In some implementations, it may not be necessarily for the center of the space to be covered by all the vectors, but a concentration of vectors in a given region of this space may "pull" the center of gravity towards it. In some implementations, the center of the cluster is not necessarily the center of the space covered by all the vectors in the cluster, but the average of all vectors in the cluster. For an extremely simplified example, when a vector 0 and three vectors 1, the center of gravity may not be 0.5 (middle point covered by the range of vectors 0 to 1), but the center of gravity may be (0+1+1+1)/4=0.75, i.e., the three vectors 1 pull the center towards 1 with a greater strength than the vector 0 alone pulls the center towards 0.

An average of all the vectors may be calculated/computed to get the center of gravity. Since the embedding space is a continuous space, the likelihood of the center being exactly equal to a particular vector in the cluster is very small, which may be as small as near to 0. Once the center is computed, the cluster vector that is the closest to the center may be selected by computing the distance between every vector to the center, then selecting the vector with the minimum distance. In some other implementations, some algorithm may be used to we compute a closest-to-the-center utterance having the closest vector in a more efficient way. For example but not limited to, a Facebook AI similarity search (FAISS) library may be used for this purpose.

The encoder 340 in FIG. 3 may receive one or more documents from input, and/or receive the plurality of clusters and/or utterance types from the clusterizer 320, and perform step 460. Specifically, the encoder may, for each cluster, encode the document based on a number of times each utterance in the cluster appears in the document to obtain an encoded document, the encoded document comprising at least one cluster identifier (ID).

In some implementations, the documents may be encoded by each unique cluster that appears in that document with the associated cluster weight for that document being the frequency of that utterance type in that document alone, not all the documents. In some other implementations, the encoder may encode one or more documents as bags of utterance types which are weighted by the frequencies of each utterance type appearing in the one or more documents.

In some other implementations, the frequency of the utterance type appearing in the document may be referred as the number of times the utterance type appears in the document. In some other implementations, frequencies of types of utterances rather than utterance frequencies may be computed. For example, the utterances may be normalized by replacing them by their canonical form (the label of the cluster the utterance belongs to), and then utterance frequencies instead of frequencies of utterance types may be computed since for a given utterance type there would only be one possible utterance (the cluster label). In some other implementations, the documents may be transformed into appearances of different cluster types, and then the frequencies of those appearances may be computed, for example, cluster No. 0 appearing 2 times, cluster No. 1 appearing 3 times, and etc.

The number of times each utterance type in the cluster appears in the document may be used to calculate a term frequency (TF) of a cluster ID corresponding to the utterance and an inverse document frequency (IDF) of the cluster ID corresponding to the utterance. In some implementations, the encoder 340 may be referred to as a document encoder, and the document encoder may process the document to obtain the number of times an utterance cluster appears in the document (TF) and the number of documents it appears (IDF), so as to calculate the TF-IDF.

The document encoder, with the encoding process, may transform each document into a bag of utterance cluster IDs. TF-IDF may be also computed per document and cluster ID. In some implementations, TF may not be referred to as term frequency, but may be referred to as cluster ID frequency. In some implementation, IDF is the inverse document frequency of the cluster IDs. The bags of cluster IDs weighted with TF-IDF scores may be passed to the LDA 350 in FIG. 3.

The LDA 350 in FIG. 3 may receive the encoded documents from the encoder, and perform step 470. Specifically, the LDA 350 may perform latent Dirichlet allocation (LDA) on the encoded documents to obtain K topics, K being a positive integer, and each topic corresponding to a cluster with a cluster ID. In some implementations, each topic may correspond to a set of key cluster IDs.

In some implementation, K may be the LDA's only hyperparameter, indicating the number of different topics to compute. Under certain circumstances, it may be difficult to know, in advance, how many different services a call center provides. Hence, an algorithm may be implemented to select a proper K value. For example, an exponential decay approach may be implemented: when a relatively large K value is selected at the beginning, the LDA may generate some meaningful topics which most of the documents correspond to, and a big number of remaining topics for which few documents correspond to; and then the topics from biggest to smallest may be reviewed so that irrelevant topics (e.g., some or most of the smaller topics) may be discarded, so as to decrease the value of K. This exponential decay method or some other methods may ensure that relevant topics would not be missed. The K value may depend on the dataset, for example under some circumstances, the K value may be initially selected to be between 5 and 60, and then may be adjusted in steps of 1 or 5 wherein a step size of 1 is slower as 56 LDA models may need to be trained rather than 12 models being trained for a step size of 5.

In some other implementations, a supervised approach may be adopted. There may be some issues/problems associated with K being too small. When K is too small, topics may correspond to multiple services, and hence additional work/efforts may be needed to distinguish between them. For example, when there are 20 services and K is chosen as 5, one of the issues/problems is that the topics are mixed together, and it's difficult for a subject (e.g., a customer service representative or a service operator) who receives the topic with lists of key utterances to figure out the meaning of the particular topic or the particular utterances. There may also be some issues/problems associated with K being too big. When K is too big, it may be less likely to have heterogeneous topics, but there will be more topics to review. One of the problems/issues may be that there are only some meaningful topics that most of the documents correspond to; and a big number of topics to which few documents correspond. Thus, a K value may be selected so that it has a high chance to be higher than the actual amount of services, yet bounded (not indefinitely big).

In some other implementations, the LDA may determine whether to discover a particular topic based on the percentage of the documents to which it corresponds, so as to lower the value of K. For example, when a topic corresponds to only a small percent (e.g., 1%, or 0.1%) of the documents, the topic may not be discovered so that the topic may not appear in the list of K topics. In some implementations, it may be determined whether a percentage of the documents to which the topic corresponds is below a threshold; and in response to the determination that the percentage of the documents to which the topic corresponds is below the threshold, the topic may be discarded, so as to lower the value of K. In some implementations, for example, a human may review the topics from the biggest to the smallest, and decide when the smaller topics begin to be systematically noise or subcategories of the bigger ones. At that point, the human may discard all the remaining topics, wherein the human capability is used to understand and interpret language, instead of solely relying on a machine learning approach that only considers co-occurrence of utterance types, without understanding what constitutes a service a customer may ask for.

In some other implementations, it may be determined whether to combine two or more topics as one topic based on their content, label, and/or type. In one implementation, when a second topic corresponding to fewer documents may be a sub-category of a first topic, it may be determined to merge the second topic into the first topic. For example, when the first topic is "where is a restaurant" and the second topic is "where is an Italian restaurant", the second topic may be merged into the first topic, so as to decrease the value of K. For example, in some implementations, the LDA may produce a set of topics described by key utterances; and a human may review the topics, interpret the meaning of the key utterances, potentially review some of the dialogs belonging to each topic, and/or decide whether two or more topics are equivalent and should be merged together or not, wherein, under some circumstances, the sentence embedding mechanism may not be perfect, and sometimes may not realize two or more utterances are equivalent, resulting in different topics with different key utterances that are actually equivalent.

The mapper 360 in FIG. 3 may receive the K topics from the LDA 350, perform the step 480, and/or output the K topics. Specifically, the mapper may receive the K topics described with lists of key utterance types or K topics with cluster IDs from the LDA. The mapper may perform a cluster to label mapping, wherein the mapper replaces the cluster IDs in each topic by the corresponding cluster label which are received from and/or generated by the auto-labeler 330. For example, in some implementations, the LDA returns K topics, and for each topic, a probability of including each utterance cluster in the documents, wherein the utterance cluster is given by a cluster ID (e.g., when there are N clusters, cluster 0, cluster 1, . . . , cluster N−1); and the mapper may replace the cluster ID by the cluster label. Hence, a human (or a program), who later tries to interpret the topics, may see examples of the most likely utterances per topic (e.g., the key utterances) instead of only cluster numbers.

Next, various embodiments of the present disclosure is described with reference to an actual application scenario. A call center scenario is used as an example. In this application scenario, a customer may have a conversation with a customer service representative (or a chatbot) at the call center, and the described method may analyze the conversation and discover the intent of the customer with a better intent description, based on which, a target response/answer may be provided, achieving a better service experience to the customer.

The present disclosure describes various embodiments for intent discovery by combining word embeddings and LDA. The system and/or method performing on bags of words share some common features compared to the system 300 and method 400 described above for utterances. Hence, in the below description, some common/similar features are not described in details, and these common/similar features from the system 300 and the method 400 may be applicable to word embeddings.

Figure 5:
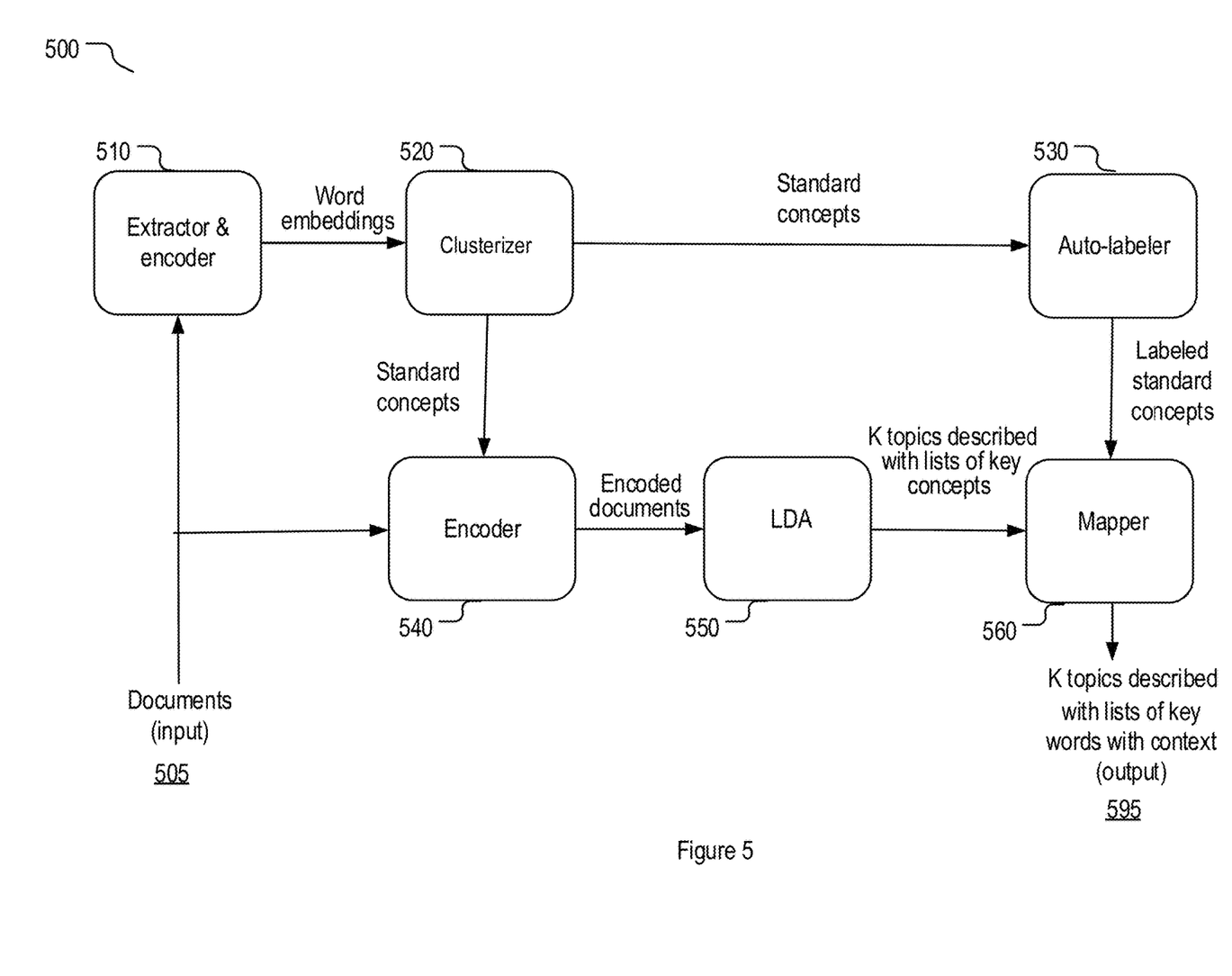
FIG. 5 shows a schematic diagram of another system for intent discovery based on word embeddings.

FIG. 5 shows a system 500 for intent discovery by combining word embeddings and LDA. The system 500 may include a portion or all of the following: an extractor and encoder 510, a clusterizer 520, an auto-labeler 530, an encoder 540, a LDA module 550, and/or a mapper 560. The system may receive an input 505, which may include one or more documents. The system may generate an output 595, which may include one or more topics described with lists of key words with context.

The extractor and encoder 510 may obtain documents, and/or extract the bags of words with context from the documents, and/or generate word embeddings. In some implementations, the documents may contain words in a variety of contexts. The embedding (e.g., a vector) of each word in each different context may be computed. Vectors may be clusterized to form groups of semantically equivalent/similar words, by taking into account the context in which they appear. For example, a same word in different contexts may have different meanings, e.g., "row the boat" vs "wait in the row".

In some implementations, bidirectional encoder representation from transformers (BERT) embeddings may be used since these embeddings take word context into account in order to provide the best vector representation possible. In some implementations with using BERT embeddings, when a word has more than one meaning, its context may be used to figure out the proper meaning. One issue/problem with using bag-of-words techniques is that, when, due to synonyms, different words correspond to the same meaning, a bag-of-words representation may consider synonyms as different concepts. Some implementations using bag-of-words techniques, when computing vectors of words, their context may not be considered, but the same word, independently of the context, may be assumed to always have the same meaning, e.g., different meanings of the word may not be distinguished. The various embodiments with BERT embeddings may overcome the above issue/problem to some extent, since vectors of synonym words should be close (e.g., as close neighbors or very close to each other in embedding space). Some other implementations may use pre-trained BERT embeddings for a variety of languages or select and use a multilingual BERT embedding. Some other implementations may use other word embedding systems that may not take context into account.

The clusterizer 520 may receive the word embeddings and clusterize word vectors. Similar algorithms as the case of utterance clusterization may be used for clusterizing word embeddings. In some implementations, the selection of the eps parameter for the clusterizer may be different: for the case of utterances, the eps parameter may be relaxed in order to let utterances form clusters; but for the case of word embeddings, the eps parameter may not be relaxed too much or otherwise words belonging to different topics (e.g., restaurant and hotel) may be clustered together. Words of different topics may need to be in different clusters so later the LDA 550 may use the word clusters to discriminate between the different topics. For example, experimentally, a first set of distances between words that appear together (e.g., book, reserve) and a second set of distances between words that are apart (e.g., restaurant, hotel) may be computed, then a value in between the first set and the second set may be selected as the eps value.

The cluster auto-labeler 530 may receive the plurality of clusters and/or standard concepts from the clusterizer 520 and obtain a cluster label to each cluster. The auto-labeler 330 may output the cluster labels and/or the labeled standard concepts to the mapper 560. In some implementations, a similar approach as the utterance cluster auto-labeler may be used for word embeddings, and the word vectors correspond to a window of text (e.g., a central word+up to 4 words to the left and 4 words to the right) instead of to utterances. When a size of the window is big enough, meaningful topic descriptors may be obtained, for example "want to book a restaurant", even if they are sentence fragments instead of full sentences.

The document encoder 540 may receive one or more documents, and transform each document into a bag of word cluster IDs. In some implementations, a similar approach as the utterance case is used wherein TF-IDF is also computed per document and cluster ID.

The LDA 550 may receive the encoded document from the encoder, and perform LDA on the encoded document to obtain K topics described with lists of key words with context. In some implementations, a similar approach as the utterance case is used for word embeddings.

The cluster-to-label mapper 560 may receive the K topics described with lists of key clusters from the LDA 550, map the label to the clusters, and/or output the K topics with lists of key words with context. In some implementations, a similar approach as the utterance case is used for word embeddings.

In the present disclosure, any steps or operations in various embodiments may be combined in any amount or in any order, as desired. In the present disclosure, two or more steps or operations in various embodiments may be performed in parallel.

In the present disclosure, when applicable, an entire system or one or more component of the system may include one or more AI machine learning techniques/networks, including but not limited to, a k-means, a term frequency-inverse document frequency (TF-IDF), a random forest, a deep neural network (DNN), and/or a recurrent neural network (RNN).

In the present disclosure, an entire system or one or more component of the system may include one or more software unit, one or more hardware unit, or a combination thereof. A software unit may include a computer program or part of the computer program that has a predefined function and works together with other related parts to achieve a predefined goal, such as those functions described in this disclosure. A hardware unit may be implemented using processing circuitry and/or memory configured to perform the functions described in this disclosure. Each unit can be implemented using one or more processors (or processors and memory). Likewise, a processor (or processors and memory) can be used to implement one or more units. Moreover, each unit can be part of an overall unit that includes the functionalities of the unit. The description here also applies to the term unit and other equivalent terms.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

While the particular disclosure has been described with reference to illustrative embodiments, this description is not meant to be limiting. Various modifications of the illustrative embodiments and additional embodiments of the disclosure will be apparent to one of ordinary skill in the art from this description. Those skilled in the art will readily recognize that these and various other modifications can be made to the exemplary embodiments, illustrated and described herein, without departing from the spirit and scope of the present disclosure. It is therefore contemplated that the appended claims will cover any such modifications and alternate embodiments. Certain proportions within the illustrations may be exaggerated, while other proportions may be minimized. Accordingly, the disclosure and the figures are to be regarded as illustrative rather than restrictive.

What is claimed is:

1. A system for intent discovery, the system comprising:
a memory storing instructions; and
a processor in communication with the memory, wherein, when the processor executes the instructions, the instructions are configured to cause the processor to:
obtain documents comprising a set of utterances;
extract the set of utterances from the documents;
generate a set of utterance embeddings based on the set of utterances;
clusterize the set of utterance embeddings to obtain a plurality of clusters, each cluster comprising one or more utterance embeddings;
obtain a cluster label for each cluster, wherein to obtain the cluster label for each cluster, the instructions are further configured to cause the processor to:
calculate a center in an embedding space for the one or more utterance embeddings in a corresponding cluster of the plurality of clusters;
select a central utterance embedding in the corresponding cluster, the central utterance embedding being a closest utterance embedding to the center among the one or more utterance embeddings in the corresponding cluster; and obtain an utterance corresponding to the central utterance embedding as a corresponding cluster label of the corresponding cluster;

encode each document of the documents based on a number of times each utterance cluster identifier (ID) appears to obtain an encoded document, the encoded document comprising at least one cluster ID with a weight;

perform latent Dirichlet allocation (LDA) on the encoded documents to obtain K topics, wherein K is a positive integer, and each topic of the K topics corresponds to a list of key clusters with cluster IDs; and for each topic, replace the cluster IDs with corresponding cluster labels.

2. The system of claim 1, wherein to generate the set of utterance embeddings based on the set of utterances, the instructions are further configured to cause the processor to:

generate the set of utterance embeddings based on the set of utterances with a neural network sentence encoder comprising one of the following models:
a sentence bidirectional encoder representation from transformers (SBERT) sentence encoder,
a universal sentence encoder (USE), and
a multilingual universal sentence encoder (MUSE).

3. The system of claim 1, wherein to clusterize the set of utterance embeddings to obtain the plurality of clusters, the instructions are further configured to cause the processor to:

clusterize, based on a first hyperparameter and a second hyperparameter, the set of utterance embeddings to obtain the plurality of clusters, the first hyperparameter indicating a minimum number of utterance embeddings in any cluster, the second hyperparameter indicating a maximum distance between any neighboring pair of utterance embeddings in any cluster.

4. The system of claim 1, wherein to clusterize the set of utterance embeddings to obtain the plurality of clusters, the instructions are further configured to cause the processor to:

clusterize the set of utterance embeddings to obtain the plurality of clusters with a clustering algorithm of density-based spatial clustering of applications with noise (DBSCAN).

5. The system of claim 1, wherein to clusterize the set of utterance embeddings to obtain the plurality of clusters, the instructions are further configured to cause the processor to:

partition the set of utterance embeddings into a plurality of subsets of utterance embeddings;
for each subset, clusterize the subset of utterance embeddings to obtain a subset of clusters; and
combine all subsets of clusters to form the plurality of clusters.

6. The system of claim 1, wherein:
the number of times each utterance in the cluster appearing in the documents is used to calculate a term frequency of a cluster ID corresponding to the utterance and an inverse document frequency of the cluster ID corresponding to the utterance.

7. The system of claim 1, wherein the instructions are further configured to cause the processor to:
determine a value of the K using an exponential decay method.

8. A method for intent discovery, the method comprising:
obtaining, by a device comprising a memory storing instructions and a processor in communication with the memory, documents comprising a set of utterances;
extracting, by the device, the set of utterances from the documents;

generating, by the device, a set of utterance embeddings based on the set of utterances;

clusterizing, by the device, the set of utterance embeddings to obtain a plurality of clusters, wherein each cluster comprises one or more utterance embeddings;

obtaining, by the device, a cluster label for each cluster by:
calculating a center in an embedding space for one or more utterance embeddings in a corresponding cluster of the plurality of clusters,
selecting a central utterance embedding in the corresponding cluster, the central utterance embedding being a closest utterance embedding to the center among the one or more utterance embeddings in the corresponding cluster, and
obtaining an utterance corresponding to the central utterance embedding as a corresponding cluster label of the corresponding cluster;

encoding, by the device, each document of the documents based on a number of times each utterance cluster identifier (ID) appears to obtain an encoded document, wherein the encoded document comprises at least one cluster ID with a weight;

performing, by the device, latent Dirichlet allocation (LDA) on the encoded documents to obtain K topics, wherein K is a positive integer, and each topic of the K topics corresponds to a list of key clusters with cluster IDs; and for each topic, replacing, by the device, the cluster IDs with corresponding cluster labels.

9. The method of claim 8, wherein the generating the set of utterance embeddings based on the set of utterances comprises:
generating the set of utterance embeddings based on the set of utterances with a neural network sentence encoder comprising one of the following models:
a sentence bidirectional encoder representation from transformers (SBERT) sentence encoder,
a universal sentence encoder (USE), and
a multilingual universal sentence encoder (MUSE).

10. The method of claim 8, wherein the clusterizing the set of utterance embeddings to obtain the plurality of clusters comprises:
clusterizing, based on a first hyperparameter and a second hyperparameter, the set of utterance embeddings to obtain the plurality of clusters, the first hyperparameter indicating a minimum number of utterance embeddings in any cluster, the second hyperparameter indicating a maximum distance between any neighboring pair of utterance embeddings in any cluster.

11. The method of claim 8, wherein the clusterizing the set of utterance embeddings to obtain the plurality of clusters comprises:
clusterizing the set of utterance embeddings to obtain the plurality of clusters with a clustering algorithm of density-based spatial clustering of applications with noise (DBSCAN).

12. The method of claim 8, wherein the clusterizing the set of utterance embeddings to obtain the plurality of clusters comprises:
partitioning the set of utterance embeddings into a plurality of subsets of utterance embeddings,
for each subset, clusterizing the subset of utterance embeddings to obtain a subset of clusters, and
combining all subsets of clusters to form the plurality of clusters.

13. The method of claim 8, wherein:
the number of times each utterance in the cluster appearing in the documents is used to calculate a term frequency of a cluster ID corresponding to the utterance and an inverse document frequency of the cluster ID corresponding to the utterance.

14. The method of claim 8, further comprising:
determining a value of the K using an exponential decay method.

15. A non-transitory computer-readable medium (CRM) storing a set of instructions for intent discovery,
wherein the set of instructions, when executed by a processor of a system, cause the processor to:
obtain documents comprising a set of utterances;
extract the set of utterances from the documents;
generate a set of utterance embeddings based on the set of utterances;
clusterize the set of utterance embeddings to obtain a plurality of clusters, each cluster comprising one or more utterance embeddings;
obtain a cluster label for each cluster, wherein to obtain the cluster label for each cluster, the instructions are further configured to cause the processor to:
calculate a center in an embedding space for the one or more utterance embeddings in a corresponding cluster of the plurality of clusters;
select a central utterance embedding in the corresponding cluster, the central utterance embedding being a closest utterance embedding to the center among the one or more utterance embeddings in the corresponding cluster; and
obtain an utterance corresponding to the central utterance embedding as a corresponding cluster label of the corresponding cluster;
encode each document of the documents based on a number of times each utterance cluster identifier (ID) appears to obtain an encoded document, the encoded document comprising at least one cluster ID with a weight;
perform latent Dirichlet allocation (LDA) on the encoded documents to obtain K topics, wherein K is a positive integer, and each topic of the K topics corresponds to a list of key clusters with cluster IDs; and
for each topic, replace the cluster IDs with corresponding cluster labels.

16. The non-transitory CRM of claim 15, wherein to generate the set of utterance embeddings based on the set of utterances, the set of instructions is further configured to cause the processor to:
generate the set of utterance embeddings based on the set of utterances with a neural network sentence encoder comprising one of the following models:
a sentence bidirectional encoder representation from transformers (SBERT) sentence encoder,
a universal sentence encoder (USE), and
a multilingual universal sentence encoder (MUSE).

17. The non-transitory CRM of claim 15, wherein to obtain the plurality of clusters, the set of instructions is further configured to cause the processor to:
clusterize, based on a first hyperparameter and a second hyperparameter, the set of utterance embeddings to obtain the plurality of clusters, the first hyperparameter indicating a minimum number of utterance embeddings in any cluster, the second hyperparameter indicating a maximum distance between any neighboring pair of utterance embeddings in any cluster.

18. The non-transitory CRM of claim 15, wherein to clusterize the set of utterance embeddings to obtain the plurality of clusters, the set of instructions is further configured to cause the processor to:
partition the set of utterance embeddings into a plurality of subsets of utterance embeddings;
for each subset, clusterize the subset of utterance embeddings to obtain a subset of clusters; and
combine all subsets of clusters to form the plurality of clusters.

\* \* \* \* \*